G. LANGFORD

Sept. 29, 1931. RAIL JOINT Re. 18,213

Original Filed Feb. 20, 1925 3 Sheets-Sheet 1

Inventor
George Langford
By Brown, Jackson, Boettcher & Dienner.
Att'ys.

G. LANGFORD

Sept. 29, 1931. RAIL JOINT Re. 18,213

Original Filed Feb. 20, 1925 3 Sheets-Sheet 2

Inventor
George Langford
By Brown, Jackson, Boettcher & Dienner,
Att'ys

G. LANGFORD

Sept. 29, 1931. RAIL JOINT Re. 18,213

Original Filed Feb. 20, 1925 3 Sheets-Sheet 3

Inventor
George Langford
By Brown, Jackson, Boettcher & Dienner.
Att'ys.

Reissued Sept. 29, 1931

Re. 18,213

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

RAIL JOINT

Original No. 1,562,423, dated November 17, 1925, Serial No. 10,537, filed February 20, 1925. Original application for reissue No. 17,561, dated January 14, 1930, Serial No. 340,937, filed February 18, 1929. Divided and application for reissue No. 17,596, dated February 18, 1930, filed December 9, 1929, Serial No. 412,949. This application for reissue filed July 13, 1931. Serial No. 550,602.

My invention relates to rail joints.

In railroad tracks it is desirable to make the joints between the ends of rails of as nearly the same characteristics as the intermediate rail as is possible. This is because track laid upon ties, as is the present practice, is an undulating structure falling and rising as the load of the wheels passes over the same. The joint should not be more rigid nor less rigid than the continuous rail. Practically this desideratum is not attainable. The strength of the joint at the cut between rail ends is the strength of the bars. But away from the cut the strength of the joint is that of the rail plus the strength of the bars, where the bars extend. The result is the stiffest part of the rail is immediately adjacent the weakest part.

The more the joint departs from the characteristic of the continuous rail, the less advantageous is the joint and the greater will be the wear upon the same.

But with the bars now in use the concentrated deflection results in concentrated wear to the extent of loosening the fit between the angular bearing surfaces of bar and rail end. The trapezoidal section of the bar is designed to wedge the bar between the lower face of the head and the top face of the flange to secure a tight fit initially. The bar is designed to be drawn tight to take up wear as it occurs, draw space being provided but it will be seen that as wear is concentrated at the center, taking up equally on the bolts will not restore the fit properly. Also the weakest part of the bar is rendered still weaker by wear.

Now according to the present invention I provide a bar which has greater depth at the center than at the ends and hence has two qualities or properties which are of great value. First the increased strength at the center of the bar provided by increased depth, reduces deflection and hence wear. Next, the increased depth insures a fit with the bearing surfaces of the rail ends even though they become worn.

The manner in which I am able to accomplish this will become apparent from the following detailed description and claims, suffice it to say here that I crown the angular bearing surfaces and flex the bar laterally to gain the greatest effect from such crowning. That is to say, the crowning tends to make the central part fit but the ends to be loose to a variable extent depending upon the condition of the bearing surfaces of the rail. I take up the lack of fit by lateral flexing of the ends of the bar, which bar thus becomes a spring, tending at all times to hold the central surfaces in close engagement.

In order to acquaint those skilled in the art with the mode of practicing the present invention, I shall describe in connection with the accompanying drawings a specific manner of practicing the same.

Figure 20:
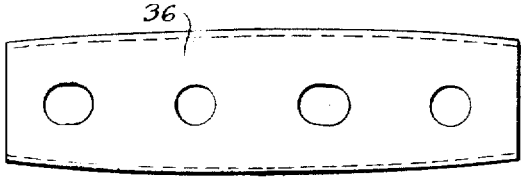
Figure 21:
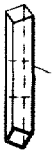
Figure 22:
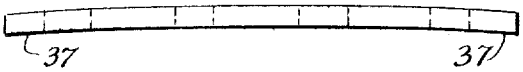
Figure 23:
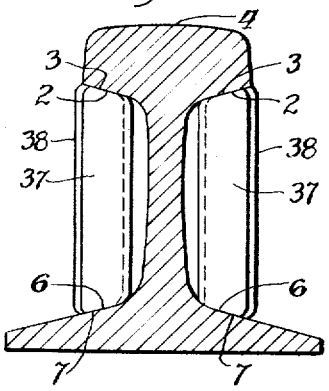
Figure 24:
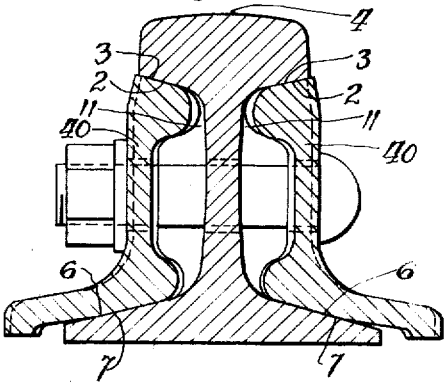

Figs. 20, 21, and 22 are similar views of a crowned bar of uniform thickness bowed out to give greater spring action;

Fig. 23 is an end view of a joint embodying my invention showing how the bars are drawn in at the ends to make the crowned edges fit along the full length of the bar; and Fig. 24 is a sectional view of a joint embodying my invention and employing angle bars of conventional section.

This application is for a reissue of my Reissue Patent No. 17,596 which in turn is a division of my reissue application for rail joint, Serial Number 340,937, filed February 18, 1929, now Reissue Patent No. 17,561, January 14, 1930.

Figure 1:
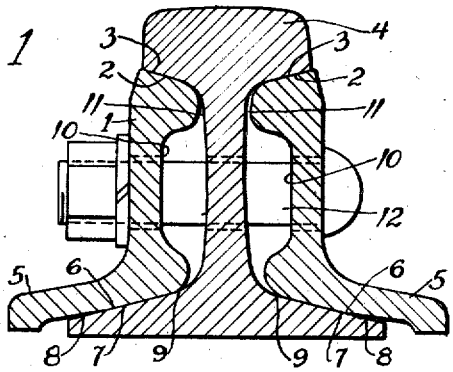
Figure 1 is a cross section of a rail joint such as is now in common use.

In Fig. 1, I have shown in end elevation a joint such as is commonly employed in tracks as now constructed, this joint comprising the angle bars 1, 1 placed on each side of the rail at the point where the joint between adjacent ends is to be made. These bars have angularly disposed bearing surfaces 2, 2 bearing against the bottom surfaces 3, 3 of the head which is indicated at 4. The angle which these surfaces make with the horizontal is generally of the order of twelve degrees, although this may be varied if desired. The bars 1, 1 have flanges 5, 5 at their lower edges, imparting lateral strength to the bar, and providing at the same time angular bearing surfaces 6, 6 which co-operate with similar surfaces 7, 7 on the top of the flange of the rail 4. The flanges 5, 5 do not bear on the base flange surface 7, 7 of the rail throughout their entire width; but only for a limited distance as, for example, between the points indicated at 8 and 9. The central part of the bars 1, 1 is cut away or relieved, as indicated at 10, in order to save weight and metal. The bars are made of a size such that there is a clearance space, as indicated at 11, between the inner surfaces of the bars and the web of the rail 4.

The surfaces 2, 3 and 6, 7 are subject to wear particularly at the central part of the bar where the actual cut in the rail is located, and the joint becomes loose due to such wear. The clearance 11 permits the bars 1 to be pressed inwardly to take up the same, as by tightening up the bolts 12.

The wear which occurs at the central part of the bars is due primarily to the passing of wheels over the joints and depressing the end of one rail with respect to the end of the other rail, thereby bringing the bars under bending stresses and shear.

Figure 3:
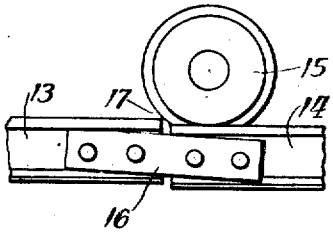
Figs. 3 and 4 are diagrams illustrating the action of a wheel passing over a joint.
Figure 4:
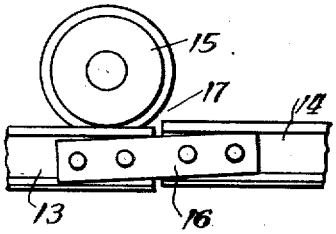

In Figs. 3 and 4 I have illustrated the manner in which the wheel passing over the joints tends to subject the bar to punishment. As the wheel 15 moves across the joint it first encounters a part of the joint where the bar 16 makes the rail more rigid than the uncut rail because of the bracing action of the bar thereupon, then as the wheel approaches the cut 17 between rail ends, the bar 16 is subjected to shear and to bending stress which puts a maximum of pressure upon the surface adjacent the extreme ends of the rails. For example, in Fig. 3 the bottom bearing surface of the head is pressed down sharply upon the top of the bar 16 while the bar presses down in turn upon the top surface of the flange of the rail 13. The ends of the bar 16 bear against corresponding surfaces of the rail ends 13 and 14, but the leverage there is greater, so that the maximum punishment comes upon the central part of the bar 16. As the wheel 15 passes over the gap or cut 17, the wheel tends to leave the one rail striking the raised end of the rail 13 and then depressing said end as is shown in Fig. 4.

Figure 1A:
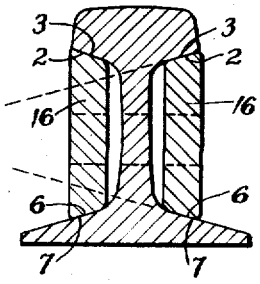
Fig. 1A is a cross section of a simplified form of joint for purposes of illustration.
Figure 2:
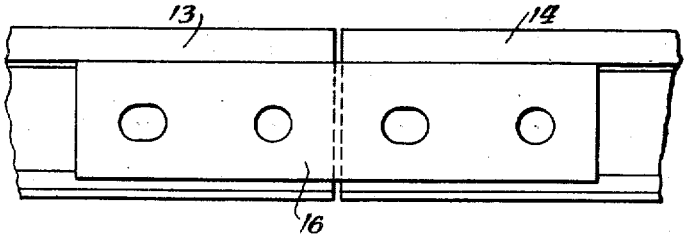
Fig. 2 is a side view with bolt heads cut away of the joint shown in Fig. 1A.

Now I have shown in Figs. 3 and 4 a flat bar trapezoidal in section as constituting the joining bar for the ends of the rail. For the sake of illustration, I have shown such a joint in section in Fig. 1A and it will simplify the explanation of the invention to consider the joint as being made by such flat bars 16, as indicated in Fig. 1A.

Figure 5:
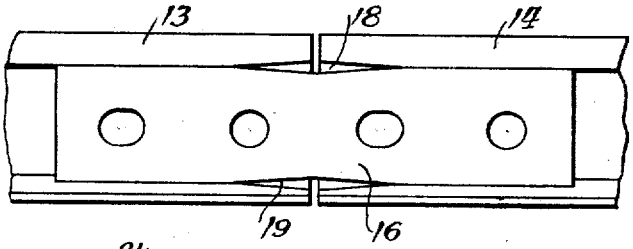
Fig. 5 is a side view similar to Fig. 2 of a worn joint.

The angle for the surfaces 2, 6 is of the order of twenty-four degrees, although this may be varied. The angle of the bearing surfaces of the bars is made the same as the angle of the bearing surfaces of the rails. Due to the wear, which has been mentioned above, the bearing surfaces become worn away as indicated at 18 and 19 in Fig. 5.

I do not mean to indicate that rail joints are actually as loose and carelessly made as shown in Figs. 3 and 4, but intend these diagrams to show the tendencies involved. As a matter of fact, a perfectly tight joint will cause wear at 18 and 19 from no other cause than the deflection of the bar. It is well known to those who are familiar with the subject that the passing of a wheel over a rail causes it to flex and modern road beds are designed to permit the same. The load of the wheel is a concentrated load and as it shifts along it tends to move the point of depression along the rail, so that the rail actually moves downward and upward as the load passes onto and off of it. The result is that, when the rail passes over the joint, even if the joint is absolutely tight, so far as drawing up the bolts is concerned, and so far as the contact between surfaces is concerned, the bending of the bars to even a slight degree results in a rubbing action between the surfaces 2, 3, and 6, 7 with the result that continued rubbing wears away the metal to the point where actual play occurs and then the pounding action which follows the existence of play augments the play and the joint rapidly deteriorates.

The expansion and contraction due to changes in temperature is another contributing factor to wear, but this is not necessarily concentrated on the central part of the bar.

In my co-pending application, Serial No. 10,536 filed February 20, 1925, I have disclosed the fundamental conception of renewing a worn bar by pressing in the side faces and pushing out the end faces to a section which will fit the worn surfaces of the rail.

Figure 6:
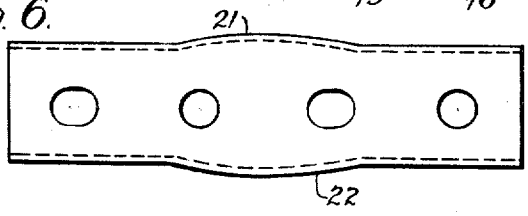
Fig. 6 is a side view and Fig. 7 an end view of a renewed bar for curing the defect caused by wear and shown in Fig. 5.
Figure 7:
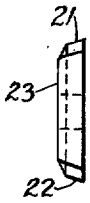

Such shape of bar is illustrated in Figs. 6 and 7 where a certain amount of crown or extrusion, as indicated at 21 and 22, is produced by thinning the central part of the bar, as indicated at the dotted lines 23 in Fig. 7.

I find that the principle of this crowned or expanded bar permits the joint to be applied to unworn rail ends for securing a tight joint.

Figure 8:
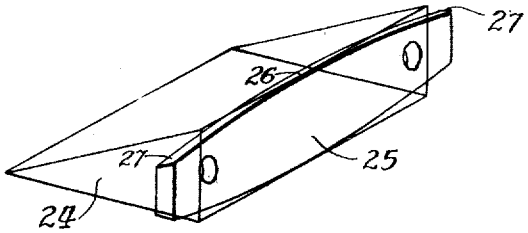
Figs. 8 and 9 are diagrammatic illustrations in isometric projection of a bar which shows how the crowned bar may be made to fit the bearing surfaces of the rail.

Assume, for example, that there is a dihedral angle, such as shown at 24 in Fig. 8, which is the dihedral angle formed between faces 3 and 7 on the rail and that this is to be engaged by a bar having greater depth at the center than at the end, such as is illustrated, for example, at 25 in Fig. 8. The central part of the bar 25 is tangent to the sides of the dihedral angle 24 and the ends of the bar are, so long as the bar is straight, out of contact with the planes defining the dihedral angle.

The angle of the edges varies from the central part 26 to the ends 27 for the purpose of securing a uniform fit between said end faces 27 and the corresponding planes of the dihedral angle 24. The variation in the angle along the top and bottom of the bar may be secured by suitably grinding the dies in which the bars are formed.

I may leave the angle uniform along top and bottom in which case, when the bar is lowered, the area of contact at the central part of the bar will be a maximum, giving maximum strength at this point and then the area will taper off toward the ends with corresponding decrease in strength and rigidity of the joint at said ends.

Figure 9:
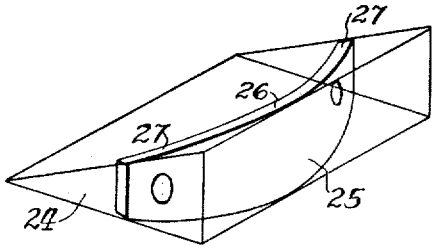

Now assume that the bar 25, as shown in Fig. 8, is forced into the position shown in Fig. 9, that is, the ends are drawn in until they fit between the sides of the dihedral angle 24. This means that the entire edge 26 and 27 at top and bottom fits into the space between the sides defining the dihedral angle and the upper edge and the lower edge of the bar 25 lie in the corresponding planes defining the dihedral angle.

Now it can be seen that if a bar, whether of thinner section at the center or of uniform section throughout, be formed as shown in Fig. 6, such a bar may, by proper flexing thereof, be made to fit into the dihedral angle defined by the planes 3, 7 of the rail.

Figure 10:
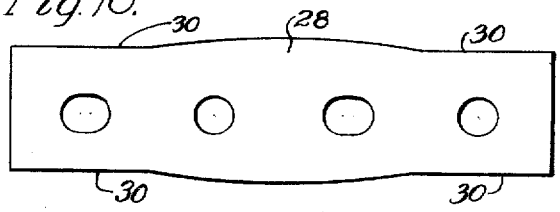
Fig. 10 is a side view and Fig. 11 an end view of a bar having a crown along a greater part of the center than would correspond to the wear of the rails.
Figure 11:
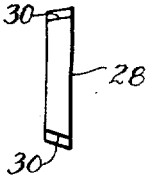

I have shown in Fig. 10 a bar of even and uniform thickness between its side faces, but being crowned or swelled as to its vertical dimension, in Figs. 10 and 11.

Figure 12:
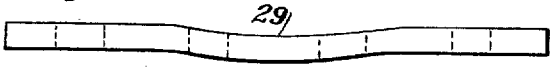
Fig. 12 is a side view and Fig. 13 an end view of the aforesaid bar after it is flexed to make it fit the bearing surfaces of the rail, i. e., new rail.
Figure 13:
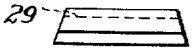

Such bar may now be employed either for forming a joint in connection with new rails, or it may be employed in repairing a joint of worn rails, since the central crowned portion may either be arched out, as indicated in Figs. 12 and 13 for forming a joint with new rails, or may remain straight when the same is used in conjunction with the repairing of worn rails. In other words, I now have produced a bar which is useful in connection either with worn rail ends or in connection with new rail ends for forming a joint.

The new bar is preferably rolled into long strips, is then cut to length, die formed to the proper formation, and then punched, or punched at the same time that it is die formed.

The production of such bar in the proper size, shape, and contour, will be readily comprehended by those skilled in the art.

Figure 14:
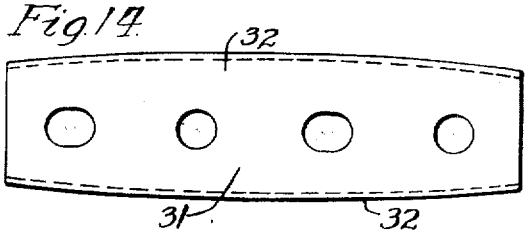
Fig. 14 is a side view and Fig. 15 an end view and Fig. 16 a top plan view of a bar which is crowned and thickened at the center, the thickening metal being applied on the outside face of the bar.
Figure 15:
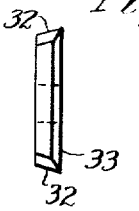
Figure 16:
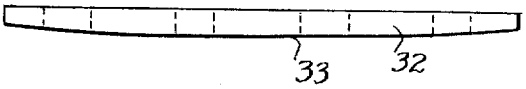
Figure 17:
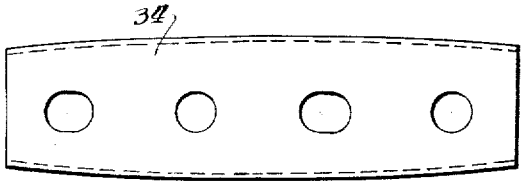
Figs. 17, 18 and 19 are side, end, and top plan views of a crowned bar showing the thickening applied to the inner side of the bar to produce in effect a bowing of the inner surface.

Now it is not essential that the ends of the bar be made parallel, as indicated at 30 in Fig. 10, and the central part only crowned for, as shown in Figs. 14 and 15, I may form the edge faces of the bar 31, shown in Fig. 14, with uniform arch or crown upon each edge 32 from end to end. At the same time the central part of the bar may be thickened, as indicated at 33 in Fig. 15, to increase the strength of the bar at the portion subjected to the greatest stress by bending in the ends. This secures the desirable results of increasing the strength of the joint at the portion which heretofore has been first subject to weakness.

Figure 18:
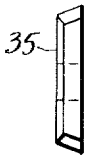
Figure 19:
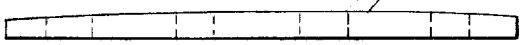

Instead of adding the thickening metal to the outside of the bar, it may be added to the inside of the bar, as indicated at 35 in Figs. 18 and 19, the bar 34 otherwise being like that shown in Fig. 14, namely, evenly arched along its top and bottom edges.

If desired, the bar may be given a camber or bow to increase the tension upon the central part to secure a better follow-up action, as shown in Figs. 20, 21, and 22. In this case the bar 36 is of uniform thickness and it has its top and bottom edges crowned, as is apparent from the drawing, and in addition it is bowed with the central part extending inwardly and the ends 37 extending outwardly, so that when the end bolts are drawn up the central part of the bar is forced into contact with the surfaces 3 and 7 of the rail to produce a pressure and, at the same time, a take-up or spring action which will tend to keep the joint tight for a longer time and also will tend to present much greater strength where it is seated.

Fig. 23 shows such a bar as that indicated in Figs. 20 to 22, inclusive, applied to two adjacent rail ends to form a joint.

It will now be seen that the ends 37 are arched in until the surfaces 2 and 3 fit along the full length of the bar independently of the central bolt, the end bolts, which draw in the ends of the bars and which have not been illustrated for the sake of clearness, make a tight joint and the pressure which may be applied by means of the central bolts, merely increases the pressure between the surfaces 2, 3 and 6, 7. The central bolts are not strictly necessary, since the spring action of the bars is sufficient to cause the wedge surfaces to engage each other. Such bolts, however, are desirable for strengthening the joint against lateral displacement.

In Fig. 24 I have illustrated a rail joint in which the bars 40 are formed of the conventional angle section and are crowned along the center to secure a fit between the surfaces 2, 3 and 6, 7 along the center before the same occurs at the ends of the bar, so that the ends of the bar must be drawn in tight by the end bolts, the bar then serving as a spring.

In one example of an embodiment of my invention I provide a twenty-four inch bar in which the central part of the bar is substantially straight for five inches along the center, and $\frac{1}{32}$ inch higher for the head wearing surface 2, and $\frac{1}{32}$ inch deeper on the flange wearing surface 6 for substantially the same distance, the quarter inch draw space 11, which prevails at the center, being reduced to one-eighth inch draw space at the ends. In other words, the bar makes a bow or camber of one-eighth inch, as between the center and ends.

In practice I do not find it necessary to vary the angle of the edge faces nor to form the crown as a strictly accurate curve, such as I have illustrated in Fig. 8, but merely an approximation thereof. Also the central part is in practice somewhat flattened off instead of being sharply crowned or arched, as this conforms more nearly to the requirements of new bars, namely, that the central part be substantially straight and the ends only bowed in. The theoretical perfect curve shown in Fig. 8 and the perfect bend shown in Fig. 9 are naturally modified by the bolt holes and the concentrated stresses of the bolts at such points.

The metal which may be added at the center of the bar to form the crown or crowns according to the present invention is a valuable addition with regard to strength as such metal is placed at maximum distance from the neutral axis.

The angle bars which embody the above structure are preferably made of medium carbon open hearth steel, heat treated and quenched in oil, so as to secure a great strength and toughness and to give a highly resilient metal which acts not only with excellent strength, but to give a suitable spring action.

Since the major part of the wear occurs at the center of the bar and a minimum at the ends, it can be seen that with the variable amount of take-up or clearance provided according to my invention, the maximum take-up is at the place where the maximum is necessary and the minimum is provided similarly where a minimum of take-up is necessary. The result is a highly advantageous structure which is useful, not only in securing greater strength and rigidity at the center in new rail joints, in connection with the joining of new rail ends, but which also has the valuable property of being capable of making a satisfactory joint in connection with the ends of rails which have previously been joined and worn so that a new bar of standard section would no longer produce a perfect joint.

Now the additional metal which the crown represents is preferably applied as an integral part of the bar, but it will be apparent that such metal may be applied as a separate part as, for example, a shim or plate at the point where the effect of crowning is desired. A single continuous plate may provide the crown at top and bottom of a bar.

What I claim is:—

1. A bar for joining adjacent ends of railroad rails, comprising a wedge bar having angularly disposed bearing surfaces at its top and bottom edges disposed for contact with the coresponding surfaces of the rail ends, said bar being of greater height at its center portion than at its end portions, said center portion of the bar being laterally convexed when the bar is out of a joint and is free from lateral tension.

2. A bar for joining adjacent ends of railroad rails, said bar being bowed lengthwise when out of a joint and free from lateral tension and having bearing surfaces disposed for contact with the corresponding surfaces of the rail ends, the center portion of the bar being of greater height than the end portions thereof.

3. A bar for joining adjacent ends of railroad rails, said bar being bowed lengthwise when out of a joint and free from lateral tension and having bearing surfaces disposed for contact with the corresponding surfaces of the rail ends, one of the bearing surfaces of the bar being crowned at its center portion.

4. A bar for joining adjacent ends of railroad rails, said bar being bowed lengthwise when out of a joint and free from lateral tension and having bearing surfaces disposed for contact with the corresponding surfaces of the rail ends, each of the bearing surfaces of the bar being crowned at its center portion.

5. A bar for joining adjacent ends of railroad rails, said bar having bearing surfaces disposed for contact with the corresponding surfaces of the rail ends and being bowed lengthwise with its outside face concave when the bar is out of a joint and free from lateral tension, said bar being higher at its center than at its ends.

6. A bar for joining adjacent ends of railroad rails, said bar being reformed from a worn bar and being incurved lengthwise at its center portion at least when out of a joint and free from lateral tension, the center portion at least of the bar being of increased fishing height above that of the original bar to preserve a suitable draw space along at least the center part of the bar, for fitting worn rail ends having various degrees of wear.

7. A bar for joining adjacent ends of railroad rails, said bar being incurved lengthwise at its center portion at least when out of a joint and free from lateral tension, the center portion at least of the bar being of increased fishing height to preserve a suitable draw space along at least the center part of the bar, for fitting worn rail ends having various degrees of wear.

8. A bar for joining adjacent ends of railroad rails, said bar being curved lengthwise at its center portion at least when out of a joint and free from lateral tension, the center portion at least of the bar being of increased fishing height to preserve a suitable draw space along at least the center part of the bar, for fitting worn rail ends having various degrees of wear.

9. A bar for joining adjacent ends of railroad rails, said bar being laterally bowed from end to end when out of a joint and free from lateral tension, the center portion at least of the bar being of increased fishing height to preserve a suitable draw space along at least the center part of the bar, for fitting worn rail ends having various degrees of wear.

10. A bar for joining adjacent ends of railroad rails, said bar being reformed from a worn bar and being outcurved lengthwise at its center portion at least when out of a joint and free from lateral tension, the center portion at least of the bar being of increased fishing height above that of the original bar to preserve a suitable draw space along at least the center part of the bar, for fitting worn rail ends having various degrees of wear.

11. A bar for joining adjacent ends of railroad rails, said bar being outcurved lengthwise at its center portion at least when out of a joint and free from lateral tension, the center portion at least of the bar being above normal fishing height to preserve a suitable draw space along at least the center part of the bar, for fitting worn rail ends having various degrees of wear.

12. A bar for joining adjacent ends of railroad rails, said bar being outcurved lengthwise at its center portion at least when out of a joint and free from lateral tension, the center portion at least of the bar being above normal fishing height to preserve a suitable draw space along at least the center part of the bar, for fitting worn rail ends having various degrees of wear, substantial lengths of the end portions of the bar being of uniform and less fishing height than the center portion of the bar.

13. A bar for joining adjacent ends of railroad rails, said bar being outcurved lengthwise at its center portion and the end portions of the bar being parallel to each other, when the bar is out of a joint and free from lateral tension, the center portion of the bar being above normal fishing height to preserve a suitable draw space along at least the center part of the bar, for fitting worn rail ends having various degrees of wear.

In witness whereof, I hereunto set my hand this 7th day of July, 1931.

GEORGE LANGFORD.

DISCLAIMER

Re. 18,213.—*George Langford*, Joliet, Ill. RAIL JOINT. Patent dated September 29, 1931. Disclaimer filed August 6, 1934, by the patentee, the assignee, *McKenna Process Company of Illinois*, assenting.

Hereby enters this disclaimer to that part of the specification which is in the following words, which your petitioner desires to erase from said specification:

In lines 87 to 95, inclusive, of page 4 of said specification, the words—

"Now the additional metal which the crown represents is preferably applied as an integral part of the bar, but it will be apparent that such metal may be applied as a separate part as, for example, a shim or plate at the point where the effect of crowning is desired. A single continuous plate may provide the crown at top and bottom of a bar."

[*Official Gazette September 4, 1934.*]